May 21, 1940.  E. G. PARTRIDGE  2,201,271
MOLD LUBRICANT
Filed June 24, 1938
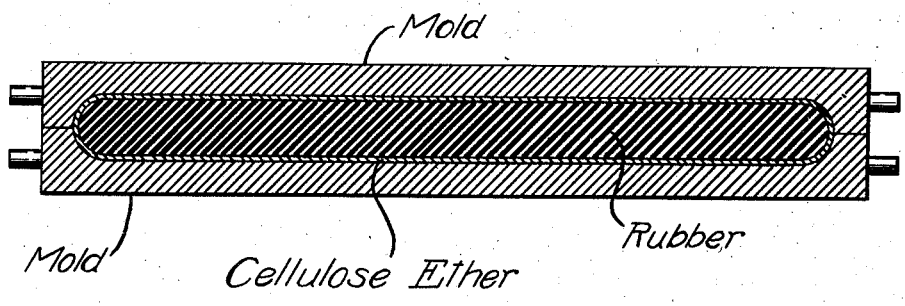
Inventor
Edward G. Partridge
By Willis F. Avery
Atty Patented May 21, 1940

2,201,271

UNITED STATES PATENT OFFICE 2,201,271

MOLD LUBRICANT

Edward G. Partridge, Stow, Ohio, assignor to The B. F. Goodrich Company, New York, N. Y., a corporation of New York Application June 24, 1938, Serial No. 215,601

4 Claims. (Cl. 18—47)

This invention relates to the molding of rubber in general, and especially to the vulcanization of latex compositions in heated molds.

It has been necessary to provide a mold lubricant in rubber molding processes to prevent the temporary or permanent adhesion of the rubber to the mold. In the past various materials such as soapbark, soap, sodium lauryl sulfate, and various other lubricants, most of which have been water-soluble, have been employed. These materials have often left a dull film on the surface of the rubber. Water soluble materials are undersirable when used with latex compositions since they tend to dissolve and carry away the lubricant.

It is an object of this invention, accordingly, to provide mold lubricants which produce rubber articles having an attractive glossy surface. Another object is to provide mold lubricants which will not be dissolved by latex compositions.

I have discovered that solutions of cellulose ethers are excellent mold lubricants. These materials show practically no adhesion to most metals, particularly if the surfaces are polished as in the case of molds, and therefore leave no residue upon the molds. Any of the cellulose ethers may be employed, methyl cellulose, ethyl cellulose, and benzyl cellulose being readily available and admirably suited to the purpose.

The invention is illustrated by the accompanying drawing, the single view of which shows a cross section of a mold containing a film of a cellulose ether between rubber and the mold.

As a specific example of my invention, a 5% solution of ethyl cellulose in denatured ethyl alcohol was brushed onto the faces of chromium plated molds, and a hard rubber latex mix was vulcanized in the molds. The cured articles were easily removed from the molds, while without the lubricant it had been impossible to remove them without breaking them. The lubricant remained on the rubber as a glossy coat leaving the mold clean and ready for immediate re-use. If the coating on the surface of the rubber is undesirable, it may easily be removed with alcohol. Any of the other cellulose ethers may be likewise employed, although benzyl cellulose and ethyl cellulose are superior to methyl cellulose when used with latex because of their greater insolubility.

Pigments such as mica, soapstone, talc, etc., may be added to the mold lubricant if desired. A solution consisting of ethyl cellulose 3.5 parts by weight, ethyl alcohol 67 parts, butyl alcohol 14.2 parts, and mica 15.3 parts is an excellent mold lubricant which very effectively prevents adhesion between molds and rubber articles molded therein.

The mold lubricants may be applied to molds by any of the usual methods such as brushing, spraying, or dipping. The solvents employed may be varied to provide mold lubricants of the desired viscosity and evaporation rate.

It is to be understood that the term "rubber" is used in a generic sense to include caoutchouc, balata, gutta-percha, synthetic rubber, or natural or artificially prepared latex, whether or not admixed with pigments, fillers, softeners, antioxidants, accelerators, etc.

Although I have herein described specific embodiments of my invention, I do not intend to limit the invention solely thereto, for it will be obvious to those skilled in the art that many modifications are within the spirit and scope of the invention as defined in the appended claims.

I claim:

1. The method of preventing the adhesion of rubber to a mold during a heat-molding process which comprises interposing between the rubber and the mold a film comprising a cellulose ether.

2. The method of preventing the adhesion of rubber to a mold during a heat-molding process which comprises interposing between the rubber and the mold a film of a solution of a cellulose ether.

3. The method of preventing the adhesion of rubber to a mold during a heat-molding process which comprises interposing between the rubber and the mold a film comprising a cellulose ether and mica.

4. The method of preventing the adhesion of a latex composition to a mold during a heat-molding process which comprises interposing between the latex and the mold a film comprising ethyl cellulose.

EDWARD G. PARTRIDGE.